United States Patent

Kunimitsu et al.

[11] Patent Number: 6,137,529
[45] Date of Patent: Oct. 24, 2000

[54] APPARATUS FOR POSITION DATA ACQUISITION AND AN APPARATUS FOR COIL POSITION RECOGNITION

[75] Inventors: Satoshi Kunimitsu; Noriyuki Kawada, both of Hiroshima; Hirofumi Yoshikawa, Tokyo; Takashi Okai, Hiroshima; Itsuo Murata, Hiroshima; Koji Horimoto, Hiroshima, all of Japan

[73] Assignee: Mitsubishi Jukogyo Kabushiki Kaisha, Tokyo, Japan

[21] Appl. No.: 07/978,957

[22] Filed: Nov. 23, 1992

[51] Int. Cl.[7] ..................................................... H04N 7/18
[52] U.S. Cl. ................................................. 348/95; 348/86
[58] Field of Search ..................................... 358/107, 167; 382/17; 348/86, 94, 95; H04N 7/18

[56] References Cited

U.S. PATENT DOCUMENTS 4,688,088  8/1987  Hamazaki et al. ....................... 358/107
4,912,770  3/1990  Seto et al. .................................. 382/17

FOREIGN PATENT DOCUMENTS 58-165006  9/1983  Japan .
162395  7/1991  Japan .
125295  4/1992  Japan .

OTHER PUBLICATIONS

Mitsubishi Heavy Industries Technical Review, vol. 28, No. 6, 1991 (Japanese).
Mitsubishi Heavy Industries Technical Review, vol. 29, No. 2, 1992 (English Version of the above reference 2) Murata et al.
"Sensor Technology," vol. 2, No. 10, pp. 74–78, 1982 (No English Translation).

*Primary Examiner*—Richard Lee
*Attorney, Agent, or Firm*—Nixon & Vanderhye P.C.

[57] ABSTRACT

An apparatus for recognizing a position, a diameter and a width of a cylindrical object such as a coil made of thin steel plate being wound while observed by a TV camera in unmanned manner. The coil is irradiated with laser light while the laser light is moved in the direction perpendicular to an axial direction of the coil. An image data by the laser light is obtained from a difference of image data in the case where the coil is irradiated with the laser light and in the case where the coil is not irradiated with the laser light. The image data is analyzed to obtain data such as the position and the like. In order to improve an S/N ratio of the image data, the difference signal is binarized and then integrated for a frame. Influence of the background light can be minimized and a memory capacity for the image data can be reduced.

3 Claims, 5 Drawing Sheets

LASER SLIT LIGHT

APPARATUS FOR POSITION DATA ACQUISITION AND AN APPARATUS FOR COIL POSITION RECOGNITION

FIELD OF THE INVENTION

The present invention relates to a position data acquisition apparatus, and more particularly to a position data acquisition apparatus of a cylindrical object having a large surface reflectance and a position recognition apparatus of the cylindrical object for automatic (unmanned) operation of a ceiling crane in a coil warehouse of an iron mill.

PRIOR ART STATEMENT

Coils of thin steel plate wound into a roll are stored in a coil warehouse during a waiting time for iron manufacturing processes and delivery.

Recently, for the purpose of automatization of operation of the coil warehouse, a plan for performing automatic (unmanned) operation of a ceiling crane is being advanced or developed. The automatic operation intends to attain large effects such as facilitation of management of operation which is difficult heretofore, improvement of productivity and homogeneity, and release of person from work under bad environment, danger work and simple work.

A difficult operation in the automatic operation of the ceiling crane is a handling operation of the coils which is heretofore performed by the operator who gets on the crane. In the handling operation, unless an exact yard of a target coil and a relative position relation between the coil position in the yard and the crane are grasped clearly, mishandling and shaking or vibration of coil are caused and accident or trouble may occur. Further, when the coils are carried into the warehouse by a trailer, there is a problem that management accuracy of the coil position is deteriorated since a stop position of the trailer is varied.

Because of the above reason, a coil position recognition apparatus which grasps the coil position exactly to supply its data to the crane is required. Such a coil position recognition apparatus is disclosed in Japanese Patent Application No. H01-301829 filed by the same applicant as that of the present application.

This apparatus utilizes the cylindrical shape of the coil and includes a light source and two TV cameras disposed in the ceiling crane to thereby measure the height distribution in the axial direction and the width direction of the coil by the triangulation system so that a center position, a radius and a width of the coil are calculated.

The ceiling crane is roughly positioned in a previously set trailer stop position and a coil position is then recognized by the apparatus to position the ceiling crane exactly.

Many algorithms for measuring the height distribution in the axial direction and the width direction of the coil have been proposed.

Referring now to FIGS. 3 to 5, the principle for recognizing the center position, the radius and the width of the coil of the conventional coil position recognition apparatus is simply described.

FIG. 3 is a perspective view schematically illustrating a configuration of the coil position recognition apparatus. TV cameras 1 and 2 and a laser source (including a scanning mirror) 3 are mounted on a trolley of the ceiling crane to measure the height distribution of the coil by the principle of the triangulation method.

In the coil yard, it is assumed that a traveling direction of the crane is a z axis, a moving direction of the trolley is an x axis and the vertical direction is a y axis.

Further, the direction of laser light is changed by the scanning mirror to form plane light as light passing through a slit. This light is named laser slit light in the specification. The laser light source and two scanning mirrors are disposed so that one laser slit light describes a locus parallel to the y-z plane and parallel to the z axis on earth and the other laser slit light describes a locus parallel to the x-y plane and parallel to the x axis.

In a light receiving plane of the two TV cameras 1 and 2, when the horizontal direction is an i axis and the perpendicular direction of the i axis is a j axis, the TV cameras are disposed so that the i axis of each of the TV cameras is parallel to each of the laser slit lights.

FIG. 4(a) is a side view of the TV camera 1, the laser light source 3 and the coil of FIG. 3 as viewed from the perpendicular direction of the axis of the coil and FIG. 4(b) is a side view of the TV camera 2 and the coil 4 of FIG. 3 as viewed from the axial direction of the coil.

Laser light emitted from the laser light source is scattered at point P on the surface of the coil and part thereof is incident on light receiving planes of the TV cameras 1 and 2. When an incident angle $\alpha$ in the j direction of the TV camera at this time is detected, a height $h(=y_1)$ of point P on the surface of the coil can be calculated by $$y_1 = h = C \tan(\theta - \alpha)$$

where C is a distance between the TV camera 1 and the laser light source 3, and $\theta$ is a mounting angle of the TV camera with respect to the horizontal plane.

A position $z_1$ in the Z direction can be calculated by $$z_1 = C \tan(\gamma/2)/\cos(\theta - \alpha)$$

where $\gamma$ is an incident angle in the i axis direction of the TV cameras 1 and 2.

An x coordinate component $x_1$ of the point P is the laser light source. In this manner, one point P'(i, j) on the laser slit image can be converted into a point $P(x_1, y_1, z_1)$ of the actual xyz three-dimensional position coordinate system.

With other algorithm, when a position of laser light on a display screen of the TV cameras 1 and 2 corresponding to a point (x, y, z) on the coil on which laser light is impinged is (i, j), the point (x, y, z) on the coil is given by $x = x$-component of the position of the laser light source (trolley)(1)

$$y = h_0 - h \tag{2}$$

$$z = (c^2 + h^2)^{1/2} \times (g/2 - i)/(g/2) \times \tan(\gamma/2) \tag{3}$$

$$h = C \tan(\theta - \alpha) \tag{4}$$

$$\alpha = \tan^{-1}\{\tan(\beta/2) \times (g/2 - j)/(g/2)\} \tag{5}$$

where $h_0$: distance between the TV camera and the ground,

C: distance between the TV camera and the laser light source (scanning mirror)

$\theta$: mounting angle of the TV camera, h: detection distance, $\alpha$: incident angle of laser light to h, $\beta$: view angle in the vertical direction (j) of the TV camera, $\gamma$: view angle in the horizontal direction (i) of the TV camera, and g: the number of dots in each of the axial directions of a photographing plane of the TV camera.

Accordingly, when the scanning mirror is scanned to irradiate the coil with laser (slit) light parallel to the z axis direction, the height distribution in the radial direction (z direction) of the coil is obtained by the above equation. Similarly, when the coil is irradiated with laser (slit) light parallel to the x direction, the height distribution in the axial direction (x direction) of the coil is obtained.

Referring now to FIG. 5, the principle of recognizing the coil position is described.

When it is assumed that the ground point immediately below the laser light source on the trolley is the origin 0, the direction parallel to the locus of the ceiling crane is the x axis, the direction parallel to the vertical direction is the y axis and the direction perpendicular to the x-y plane is the z axis.

The coil is assumed to be disposed so that its central axis (width direction) is parallel to the x axis as shown in FIG. 5.

FIG. 5($a$) shows a projection position of the laser light in the x-z plane. FIGS. 5($b$) and ($c$) show an example of a measured result of the height distribution on the coil parallel to the x and z axes.

From FIG. 5($c$), a width D of the coil and a central position B of the width are given by $$D = L \tag{6}$$

$$B = B(x_b, y_b, z_b) \tag{7}$$

Since the height data in the radial direction of FIG. 5($b$) is data on the coil (cylinder), the following equation of a circle is satisfied.

$$(y_i - y_a)^2 + (z_i - z_a)^2 = r^2 \tag{8}$$

where $y_i$ and $z_i$ are the height data in the radial direction on the coil (circle), $y_a$ and $z_a$ are center coordinates of the circle, and r is a radius of the coil.

When the following equation is defined as the function of the central position $A(y_a:z_a)$ and the radius r of the circuit, $$f_i = (y_i - y_a)^2 + (z_i - z_a)^2 - r^2 \tag{9}$$

$y_a$, $z_a$ and r which minimize the following evaluation function F are values of $y_a$, $z_a$ and r.

$$F = \sum_{i=1} f_i^2 \tag{10}$$
$$= \sum_{i=1} \{(y_i - y_a)^2 + (z_i - z_a)^2 - r^2\}^2 \to \min$$

This minimum problem can be solved by the Newton-Raphson method, for example, if three or more position coordinates $(y_i, z_i)$ on the circumference of the circle are given.

From the foregoing, the central position $G(x_g, y_g, z_g)$, the radius r and the width D of the coil are given by $$G \begin{cases} x_g = x_b \\ y_g = y_a \\ z_g = z_a \end{cases} \tag{11}$$

$$r = r \tag{12}$$

$$D = L \tag{13}$$

Accordingly, if the center of the handling of the crane is set to correspond to the origin 0 of the coordinate system, the above values can be used as crane control amounts.

FIG. 6 is a block diagram schematically illustrating a conventional position data acquisition apparatus.

The laser light source 3 is turned off and the coil 4 is imaged or photographed by the TV camera 1 so that the image of the coil taken by the camera is stored in a reference image memory 8. The laser light source 3 is turned on and the scanning mirror 3 is scanned to image or photograph the coil by the TV camera 1. A difference between the image data of the coil taken by the camera and the reference image memory is calculated by a difference circuit 9D, so that only a laser spot image can be extracted. This operation is repeatedly made by an integrating circuit 9I to perform integration and binarization is then made by the binarization circuit 9B, so that the laser spot images can be connected to compose the laser slit image.

Thus, each of points on the laser slit image is processed by the above equation, so that the height distribution in the z direction of the coil of FIG. 5($b$) is obtained. Similarly, the TV camera 2 is placed on the z axis and the scanning mirror 3 is scanned to irradiate laser (slit) light parallel to the x axis direction on the coil 4, so that the height distribution in the x direction of the coil of FIG. 5($c$) is obtained.

In brief, the scanning mirror is controlled to move the laser light in parallel to the radial direction and the width direction of the coil, which is then imaged or photographed by the TV camera and is subjected to the binarization in the binarization unit after integration, so that the laser slit image is composed and extracted.

OBJECT AND SUMMARY OF THE INVENTION

The conventional position data acquisition apparatus has the following problems.

When the brightness (signal) of the laser image on the image data of one frame before the integration is a and the brightness (noise) of the background is b (a>b), an S/N ratio P of the image data of one frame before the integration is given by $$P = a/b > 1 \tag{1}$$

An S/N ratio Q of the image data after the integration for n frames is given by $$Q = \{a + (n-1)b\}/nb \tag{2}$$

where n is the number of frames obtained when the laser image passes one time from the left end to the right end of the image data.

When the S/N ratios of the image data before and after the integration are compared, the following equation is given $$Q/P = \{a + (n-1)b\}/na < 1 \tag{3}$$

It is understood that the S/N ratio of the image data is reduced by the integration. Further, it is understood from the equation (2) that the S/N ratio is reduced as n becomes larger.

Accordingly, in the binarization unit of the conventional coil position recognition apparatus, since the S/N ratio of the image data is reduced by the integration, it is difficult that the laser slit image is extracted with high accuracy.

It is a first object of the present invention to improve an S/N ratio of a position data acquisition apparatus in which an image data when not irradiated with laser light is recorded in a reference image memory and the image data recorded in the reference image memory is subtracted from an image data when irradiated with the laser light to thereby obtain the image data by the laser light.

It is a second object of the present invention to improve a coil position recognition apparatus for automatic operation of a ceiling crane in a coil warehouse of an iron mill by improving the S/N ratio of the position data acquisition apparatus.

The first object is achieved by the position data acquisition apparatus comprising a reference image memory for storing an image data imaged or photographed by a TV camera in the state where a laser light source is previously turned off prior to the beginning of the measurement, a difference circuit for calculating a difference between the image data stored in the reference image memory and the image data photographed by the TV camera while the laser light source is on and a scanning mirror is scanned, a binarization circuit for binarizing the image data, and an integrating circuit for piling up the binarized image data for each frame by a logical OR operation whereby a laser slit image (image data) is composed.

The second object is achieved by a coil position recognition apparatus including a laser light source, a scanning mirror for converting spot light of the laser light source into one-dimensional slit light, two TV cameras for imaging or photographing the slit light irradiating a coil, an A-D converter for digitizing the image signal of the TV cameras, a position data acquisition apparatus for extracting a laser slit image from the digitized image data, a coordinate conversion unit for converting position data of the laser slit image on the image data into three-dimensional position coordinates in the actual space, an operation unit for calculating a center position and a radius of the coil on the basis of the three-dimensional position coordinate data in the radial direction of the coil, and an end point detection unit for detecting position data of both ends of the laser slit image on the coil on the basis of the three-dimensional position coordinate data in the width direction of the coil and calculating a width of the coil, the coil position recognition apparatus being characterized by the position data acquisition apparatus comprising a reference image memory for storing an image data photographed by a TV camera in the state where a laser light source is previously turned off prior to the beginning of the measurement, a difference circuit for calculating a difference between the image data stored in the reference image memory and the image data photographed by the TV camera while the laser light source is on and a scanning mirror is scanned, a binarization circuit for binarizing the image data, and an integrating circuit for piling up the binarized image data for each frame by a logical OR operation whereby a laser slit image (image data) is composed.

As can be seen in comparison of FIG. 6 schematically illustrating a conventional position data acquisition apparatus with FIG. 2 schematically illustrating the position data acquisition apparatus of the present invention, the order of the integrating process and the binarization process is replaced. More particularly, in the position data acquisition apparatus of the present invention, a difference of the image data photographed by the TV camera and the image data stored in the reference image memory is calculated and then binarized to extract the laser image, and the extracted laser images are integrated for n frames to compose the laser slit image.

Since the S/N ratio P of the image data before the binarization is not $\{a+(n-1)b\}/nb$, but $a/b$, it is larger than the S/N ratio Q in the conventional position data acquisition apparatus. Accordingly, the reliability of extraction accuracy of the laser image is high.

BRIEF DESCRIPTION OF THE INVENTION

Figure 5A:
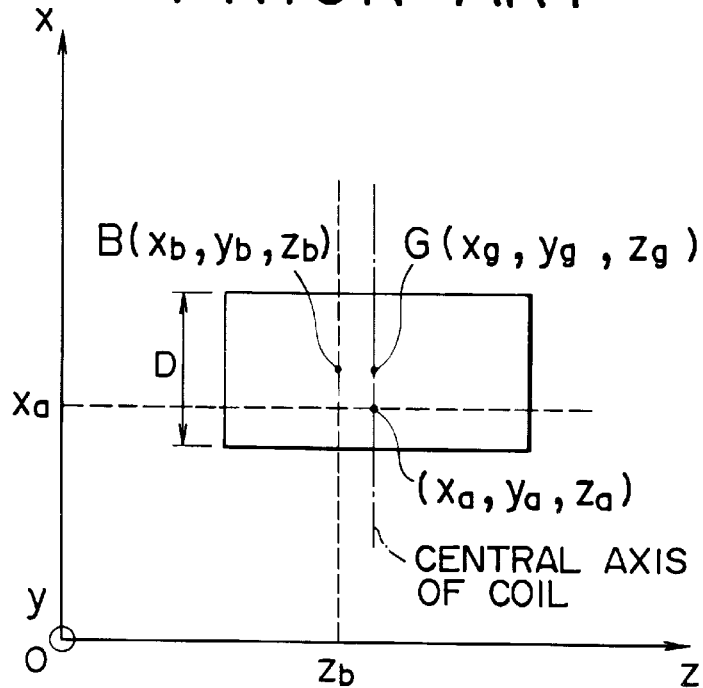
FIG. 5 is a top view of the coil showing a relation of the coil, laser slit light, a width of the coil and a center axis of the coil in the coil position recognition apparatuses of the present invention and the prior art.
FIG. 5(b) shows a signal representing the height distribution of the coil obtained when an image signal of laser slit light perpendicular to the axis of the coil is processed by the position data acquisition apparatuses of the present invention and the prior art.
Figure 5B:
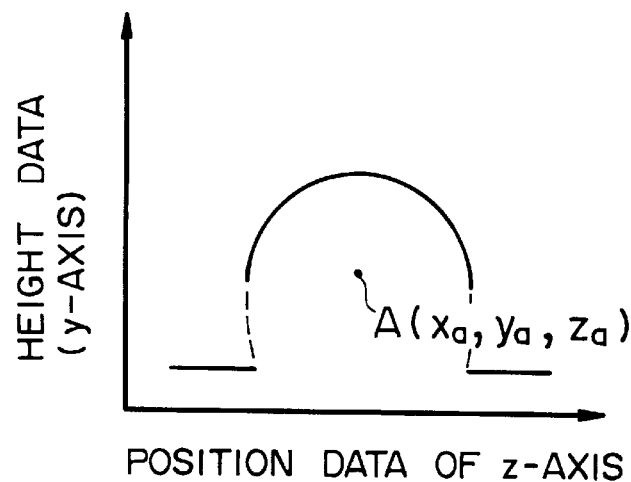
Figure 5C:
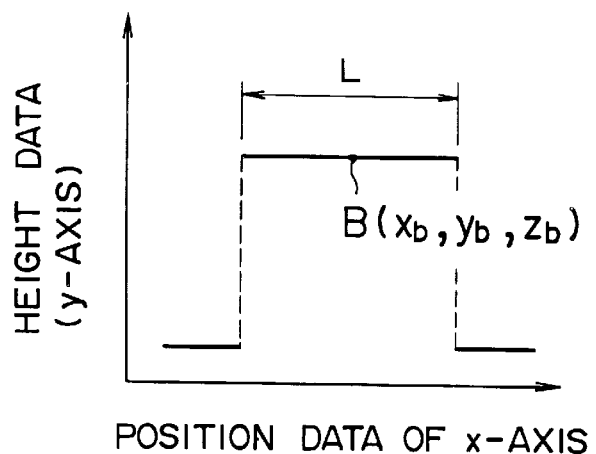
Figure 6:
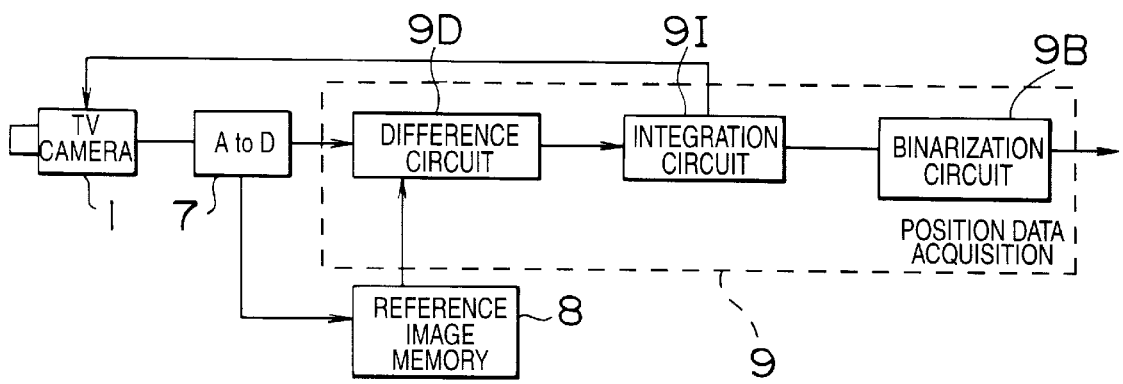

FIG. 5(c) shows a signal representing the height distribution of the coil obtained when an image signal of laser slit light parallel to the axis of the coil is processed by the position data acquisition apparatuses of the present invention and the prior art; and FIG. 6 is a block diagram of an image signal processing circuit including a block diagram of a conventional position data acquisition apparatus.

PREFERRED EMBODIMENT OF THE INVENTION

Figure 1:
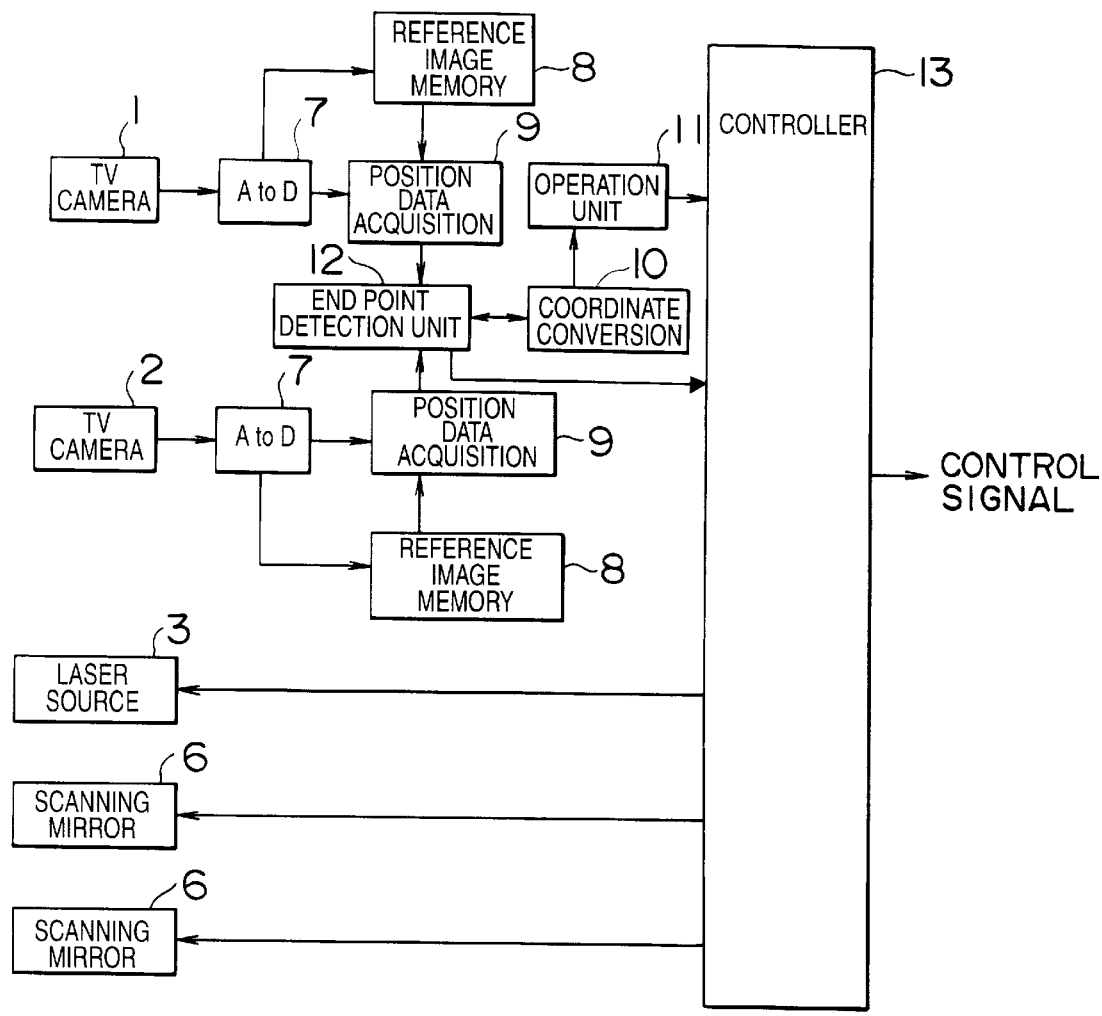
FIG. 1 is a block diagram of a coil position recognition apparatus according to the present invention.

An embodiment of the present invention is now described with reference to FIGS. 1, 2 and 3.

In a coil yard in which coils are stored, it is assumed that any position on the ground is the origin 0, a direction parallel to a moving direction of a trolley is an x-axis, a direction perpendicular to the x-axis in the horizontal plane is a z-axis and the vertical direction is a y-axis.

Reference numerals 1 and 2 denote TV cameras, 3 a laser light source and 6 a scanning mirror. The scanning mirror 6 and the laser light source 3 move laser light in parallel to the x-axis or the z-axis in reciprocating manner to form laser slit light. Selection as to the formation of the laser slit light in the x-axis or the z-axis direction is made by a controller 13. The TV camera 1 photographs an image for measuring a height distribution in the x-axis direction of the coil 4 and the TV camera 2 photographs an image for measuring a height distribution in the axial direction of the coil 4.

Figure 2:
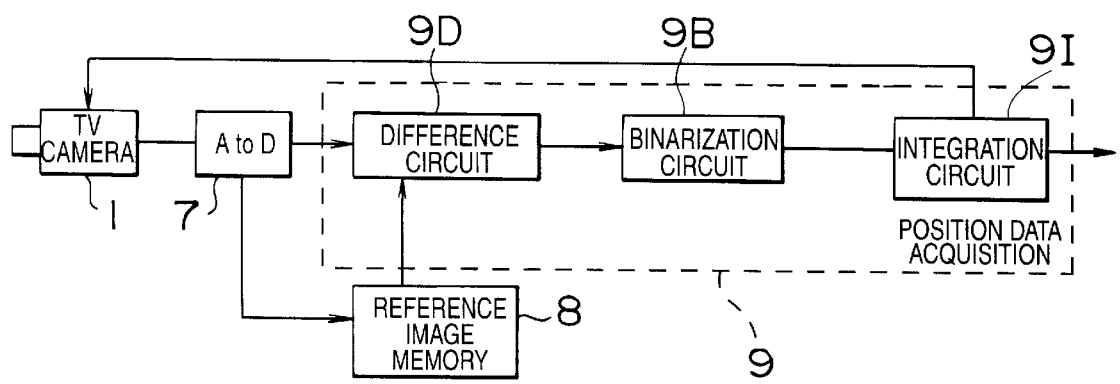
FIG. 2 is a block diagram of an image signal processing circuit including a position data acquisition apparatus according to the present invention.

Reference numeral 7 denotes an A-D converter for A-D converting the image signal of the TV camera, 8 a reference image memory for storing the image signal of the coil 4 photographed when the coil is not irradiated with laser light, 9 a position data acquisition apparatus configured as shown in FIG. 2, 10 a coordinate conversion apparatus for calculating a position of the xyz coordinate system in the actual space on the basis of a position (i, j) of one point on the image data, 11 an operation unit for solving an equation for a circle by the Newton-Raphson method on the basis of three or more three-dimensional position coordinate data in the radial direction of the coil and calculating a center position in the z direction and a radius of the coil, 12 an end point detection unit for detecting positions of both ends of the coil from the laser slit image in the axial direction of the coil, and 13 a controller having the function to control operation of the TV cameras, the laser light source and the scanning mirror and receive calculated results (position ($x_g$, $y_g$, $z_g$) of the center of the gravity, the width D and the radius r of the coil) of the end point detection unit and the operation unit to produce a control signal for controlling operation of the crane.

Figure 3:
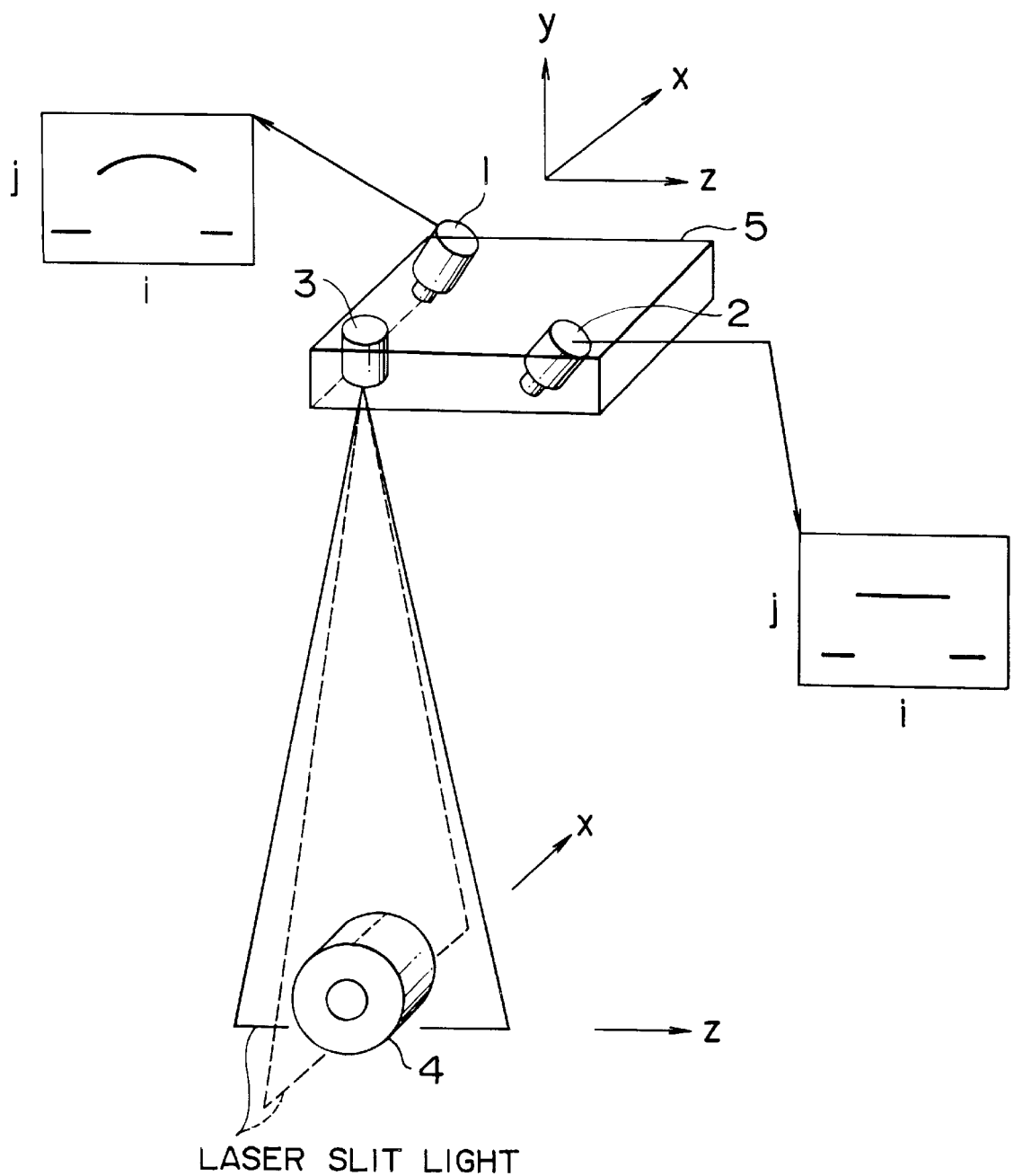
FIG. 3 is a perspective view schematically illustrating the coil position recognition apparatus of FIG. 1.
Figure 4C:
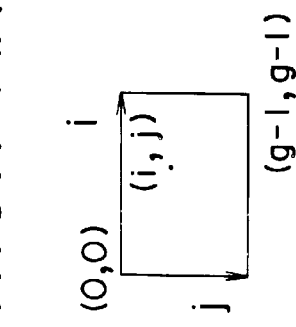
FIG. 4(c) shows a coordinate system of a light receiving plane of a TV camera.
Figure 4B:
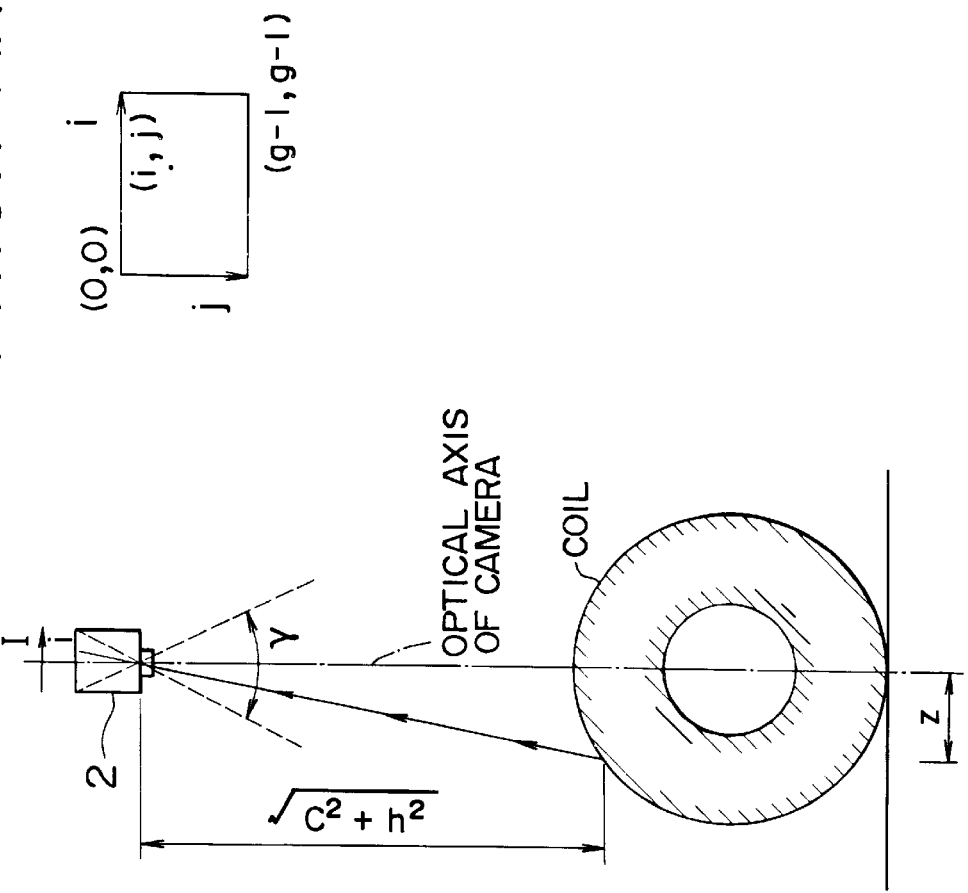
FIG. 4(b) is a side view of the coil position recognition apparatus of FIG. 3 as viewed from the x direction.
Figure 4A:
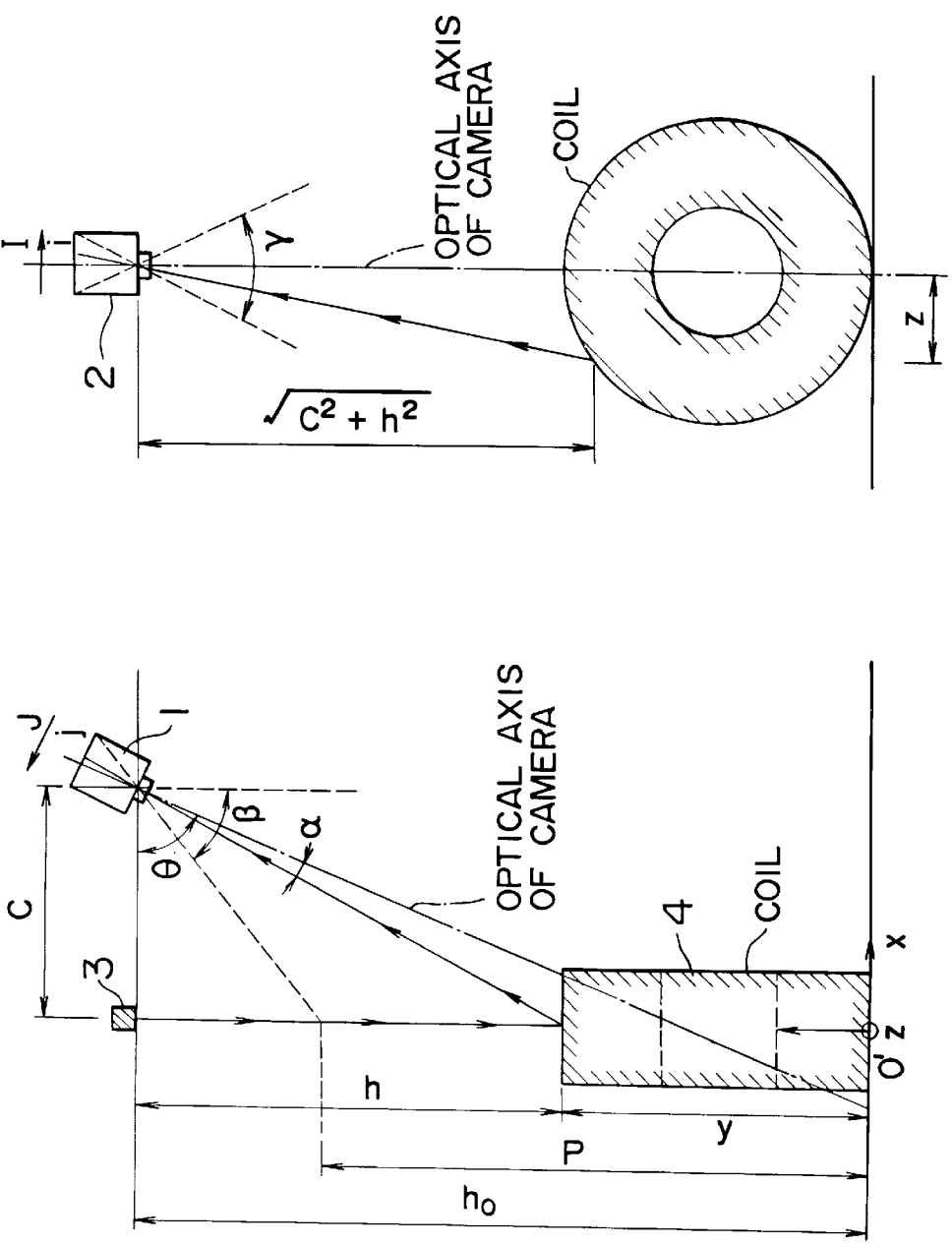
FIG. 4(a) is a side view of the coil position recognition apparatus of FIG. 3 as viewed from the z direction.

As shown in FIG. 3, the laser light source 3, the two scanning mirrors 6 and TV cameras 1 and 2 are mounted on the trolley 5 near the ceiling or on a movable apparatus capable of being moved independent of the crane.

Operation of the apparatus is now described on the assumption that the trolley 5 is roughly positioned above the coil to be handled.

In the state where the coil is not irradiated with the laser light, the coil is photographed or imaged in the radial direction and the width direction thereof by the TV cameras 1 and 2 and the output signal of the TV camera 1 is A-D converted by the A-D converter 7, the converted output signal from the converter is recorded in the reference image memory 8.

The two scanning mirrors 6 are then controlled to irradiate the coil with the laser light so that the laser light is moved in parallel to the z-axis directions of the coil in reciprocating manner. The irradiated coil with the laser light is photographed by the TV camera 1 and its image signal is A-D converted by the A-D converter 7. Then, in the position data acquisition apparatus 9, the laser slit images in the z-axis direction are composed and extracted (image data ① of FIG. 3). This extracted image data is converted into positional data of the xyz coordinate system in the coordinate conversion apparatus 10 and data on the coil is then substituted for the equation of the circle in the operation unit 11, so that the center position ($y_0$, $z_0$) and the radius r of the coil 4 are supplied to the controller 13.

After the controller 13 has received the data, the controller 13 controls the two scanning mirror 6 to irradiate the coil 4 with the laser light so that the laser light is moved in parallel to the width direction of the coil in reciprocating manner. The irradiated coil with the laser light is photographed by the TV camera 2 and its image signal is A-D converted by the A-D converter 7. Then, in the position data acquisition apparatus 9, the laser slit images in the x-axis direction are composed and extracted (image data ② of FIG. 3). Position of both ends of the coil is detected in the end point detection unit 12 in accordance with the extracted image data and is converted into positional data of the xyz coordinate system in the coordinate conversion apparatus 10, so that the width D and the center position $x_0$ in the width direction of the coil 4 are calculated and supplied to the controller 13. The controller 13 receives the information and then produces a control signal for the crane.

The position data acquisition apparatus 9 is a portion enclosed by broken line in FIG. 2.

The image signal obtained by the TV camera is converted into a digital signal in the A-D converter 7. The image signal in the case where the coil is not irradiated with the laser light is recorded in the reference image memory 8. The image signal in the case where the coil is irradiated with the laser light is also converted into a digital signal in the A-D converter 7.

In the difference circuit 9D of the position data acquisition apparatus 9, a difference between the image signal in the case where the coil is irradiated with the laser light and the image signal in the case where the coil is not irradiated with the laser light is calculated. That is, a difference signal between the current image signal and the image signal produced before one frame is calculated. The difference signal is compared with a fixed threshold in the binarization circuit 9B to be converted into a binarized image signal.

The binarized image signals are integrated for n frames in the integrating circuit 9I including an OR circuit. That is, this process is repeated n times. n is the number of frames recorded in the image memory of the apparatus. An output of the integrating circuit 9I is an output of the position data acquisition apparatus 9.

The features of the position data acquisition apparatus 9 are as follows:

(1) The position of the laser spot light on the surface of the coil is always moved by scanning of the mirror. The difference between the current image data and the image data produced before one frame is calculated to cancel the background light (external disturbance light).

(2) In order to ensure the high S/N ratio (ratio in the brightness of the laser light and the background light), the binarization is made just after the calculation of the difference to detect the laser light. If the integration for the next frame is performed without the binarization, since the position of the laser spot light is always moved, the brightness of the laser light and the background light is averaged on the track of the laser spot light and the S/N ratio is reduced, so that it is difficult to detect only the laser light.

Since the S/N ratio of the image data for performing the binarization is improved, the reliability of the process in the composition and extraction of the laser slit image is improved.

(3) Implementation of the binarization before the integration can reduce a memory capacity necessary for the integration greatly and contribute high-speed operation of the process and reduction of a cost.

For example, when it is assumed that the magnitude of the image data is 512×512×8 bits, the conventional apparatus requires a memory having a capacity of 512×512×16 bits (the number of times for the integration is maximum 256) to perform the integration, whereas the apparatus of the present invention requires 512×512×1 bits (the number of times for the integration is infinite) and the memory capacity necessary for the integration is reduced to $\frac{1}{16}$.

In order to utilize the features of the position data acquisition apparatus 9, it is desirable to perform as follows:

i) For the detection process of the laser slit image, a special image processing board is manufactured to make operation at high speed.

ii) A band-pass filter (band: 3 nm) for passing only the wavelength of the laser light is mounted in the camera to exclude external disturbance light other than the wavelength of the laser light.

iii) In order to detect scattered weak component reflected by the surface of the coil, a camera [0.51×(F12)] having high sensitivity is adopted.

What is claimed is:

1. A position data acquisition apparatus for providing position data with respect to an object, said apparatus comprising:

a TV camera;

a laser light source;

a difference circuit for calculating a difference signal between a first image data taken with said TV camera while said laser light source is off and a second image data taken with said TV camera while said laser light source is on;

a binarization circuit for binarizing an image data signal from said difference circuit by comparing said image data signal with a threshold value; and an integrating circuit for integrating outputs of said binarization circuit for a frame and for producing the position data output.

2. A position recognition apparatus of a cylindrical object, said apparatus comprising:

a laser light source, a scanning mirror for converting spot light of said laser light source into one-dimensional slit light, two TV cameras for photographing the slit light irradiating said cylindrical object, an A-D converter for digitizing image signals of said TV cameras and providing a digitized image data, a position data acquisition apparatus for extracting a laser slit image from the digitized image data, a coordinate conversion unit for converting position data of the laser slit image into three-dimensional position coordinates, an operation unit for calculating a center position and a radius of said cylindrical object on the basis of the three-dimensional position coordinates in the radial direction of the cylindrical object, an end point detection unit for detecting position data of both ends of the laser slit image on said cylindrical object on the basis of the three-dimensional position coordinates in the width direction of said cylindrical object and calculating a width of said cylindrical object, wherein said position data acquisition apparatus comprising:

a difference circuit for calculating a difference signal between a first image data taken with said TV cameras while said laser light source is off and a second image data taken with said TV cameras while said laser light source is on;

a binarization circuit for binarizing an image data signal from said difference circuit by comparing said image data signal with a threshold value; and an integrating circuit for integrating outputs of said binarization circuit for a frame and for producing the laser slit image.

3. A position recognition apparatus of a cylindrical object according to claim 2, wherein said cylindrical object is a coil made of thin steel plate.

* * * * *